United States Patent [19]

Chan et al.

[11] Patent Number: 5,577,201
[45] Date of Patent: Nov. 19, 1996

[54] DIAGNOSTIC PROTOCOL AND DISPLAY SYSTEM

[75] Inventors: Patrick C. S. Chan, Coto De Caza; Gary C. Whitlock, Mission Viejo, both of Calif.

[73] Assignee: Unisys Corporation, Blue Bell, Pa.

[21] Appl. No.: 531,020

[22] Filed: Sep. 20, 1995

Related U.S. Application Data

[63] Continuation of Ser. No. 217,572, Mar. 24, 1994, abandoned.

[51] Int. Cl.$^6$ .................................................. G06F 11/00
[52] U.S. Cl. .............................. 395/185.1; 395/183.2
[58] Field of Search .......................... 395/183.2, 185.1, 395/185.01; 371/48, 72

[56] References Cited

U.S. PATENT DOCUMENTS

| | | | |
|---|---|---|---|
| 4,290,138 | 9/1981 | Bare et al. | 371/29.1 |
| 4,586,147 | 4/1986 | Tadokoro | 371/29.1 |
| 4,592,053 | 5/1986 | Matsuura | 371/29.1 |
| 4,633,469 | 12/1986 | Kishi et al. | 371/29.1 |
| 4,745,602 | 5/1988 | Morrell | 371/29.1 |
| 4,803,592 | 2/1989 | Ashley | 371/29.1 |
| 4,814,754 | 3/1989 | Kawasaki et al. | 371/29.1 |
| 5,047,977 | 9/1991 | Hill et al. | 371/29.1 |
| 5,081,627 | 1/1992 | Yu | 371/29.1 |

*Primary Examiner*—Robert W. Beausoliel, Jr.
*Assistant Examiner*—Joseph E. Palys
*Attorney, Agent, or Firm*—Alfred W. Kozak; Mark T. Starr; Steven R. Petersen

[57] ABSTRACT

A diagnostic protocol and display system wherein the cable bus output of a computer to a printer is sensed to select coded error data out of the output stream in order to activate a visual display of coded error data for benefit of the human operator.

7 Claims, 5 Drawing Sheets

DIAGNOSTIC PROTOCOL AND DISPLAY SYSTEM

This is a continuation of application Ser. No. 08/217,572 filed on Mar. 24, 1994, now abandoned.

FIELD OF THE INVENTION

This disclosure relates to systems for diagnosing and displaying status and error conditions in a personal computer environment.

BACKGROUND OF THE INVENTION

As seen in FIG. 4A, a personal computer will generally have a line printer connector and a cable which is connected to a printer such as printer 40 in order to print out required data which has been processed in the computer. Thus the line printer connector uses a cable A in order to make the connection to the printer 40 from the personal computer (PC) motherboard $10_m$.

At the same time it has been found desirable to also display, using a display means, the status of the personal computer and any error indications which may result from diagnostic operations. Thus the problem arises as to how to provide some means for displaying error or status conditions in the personal computer (PC) with a minimal interference to and a minimal amount of extra hardware changes to the personal computer platform.

As seen in FIG. 4B, the present disclosure arranges for the interconnection of a newly modified cable AA such that while the same output connection is made to the printer 40, there is a corresponding extension cable $10_c$ which is connected to a power control card 20 which enables signals to be provided to a display panel 30. The display panel 30 has three digital displays demarked as display position 0, display position 1 and display position 2. Additionally, the display panel 30 provides a series of light emitting diode signals and a set/reset button.

While the prior art and otherwise normal handling of adding a display system to a PC motherboard would normally require the use of another card slot with the insertion of a printed circuit board for the card slot, the present disclosure enables the elimination of any need for a printed circuit slot on another printed circuit board. No changes are required to the hardware of the personal computer motherboard except for a new internal Y-ribbon cable, designated cable AA (FIG. 4B), which shares the common line printer interface but still does not disrupt the normal printer operations that are concurrently ongoing.

SUMMARY OF THE INVENTION

The line printer output connector of a personal computer motherboard is modified to also feed a power control card which regulates a display panel permitting code numbered displays which will indicate the status condition of the personal computer and also any error conditions as a result of diagnostic operations.

The personal computer includes a disk unit with software which provides diagnostic routines through which the results can be output onto the display panel for operator view and analysis.

A single output cable from the personal computer has buses which feed data to a printer and buses which feed a power control card having a state machine with a protocol that implements a special display. The state machine recognizes error code data destined for diagnostic display via a "Sequence 1" and "Sequence 2" signal from the personal computer. The state machine conveys error code data, when necessary, for display on windows in a display panel unit visible to an operator.

DESCRIPTION OF PREFERRED EMBODIMENT

Figure 1:
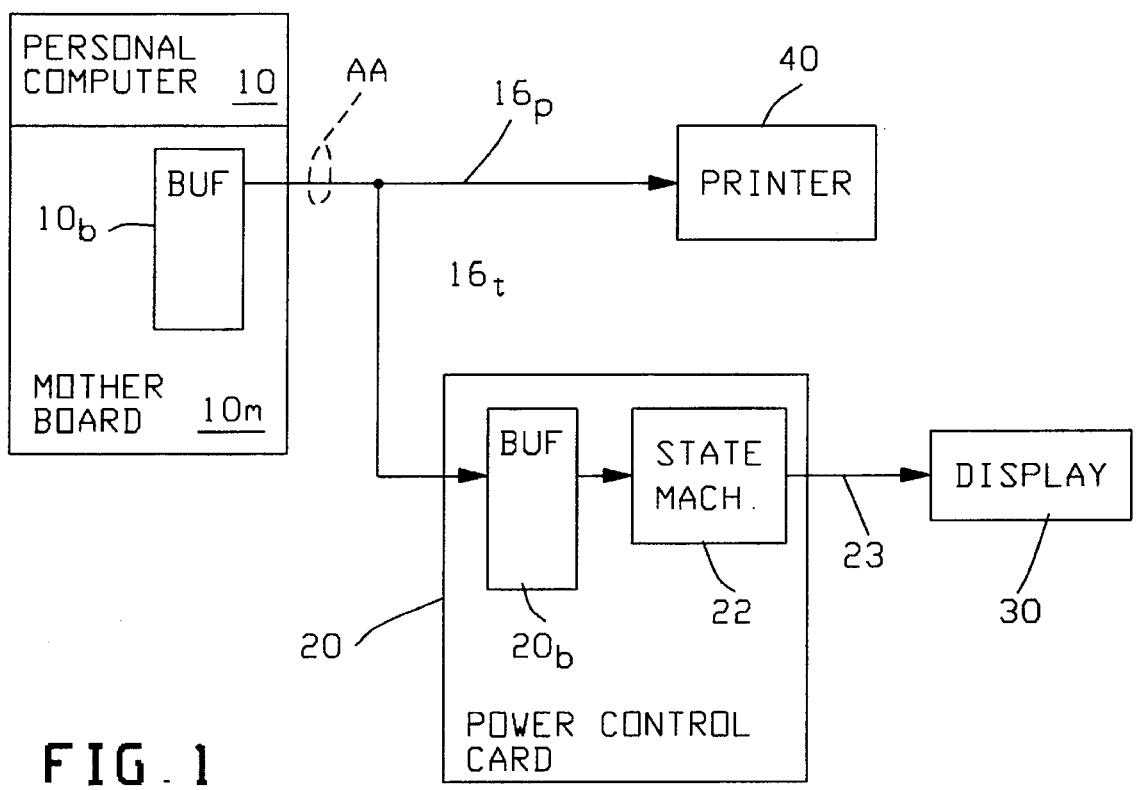
FIG. 1 is a block diagram showing the modular elements involved in the present diagnostic protocol and display system.

A general overview of the presently described diagnostic protocol and display system is seen in FIG. 1 in block diagram form. A personal computer 10 includes a motherboard $10_m$ which holds a buffer $10_b$ whereby coded data is sent to a printer 40 for printout. Additionally, the buffer $10_b$ also connects to a power control card 20 having a buffer $20_b$ which provides data to a State Machine Unit 22 which functions to interpret status data of the computer and error data in the computer into signals which can be displayed on display unit 30.

Figure 2:
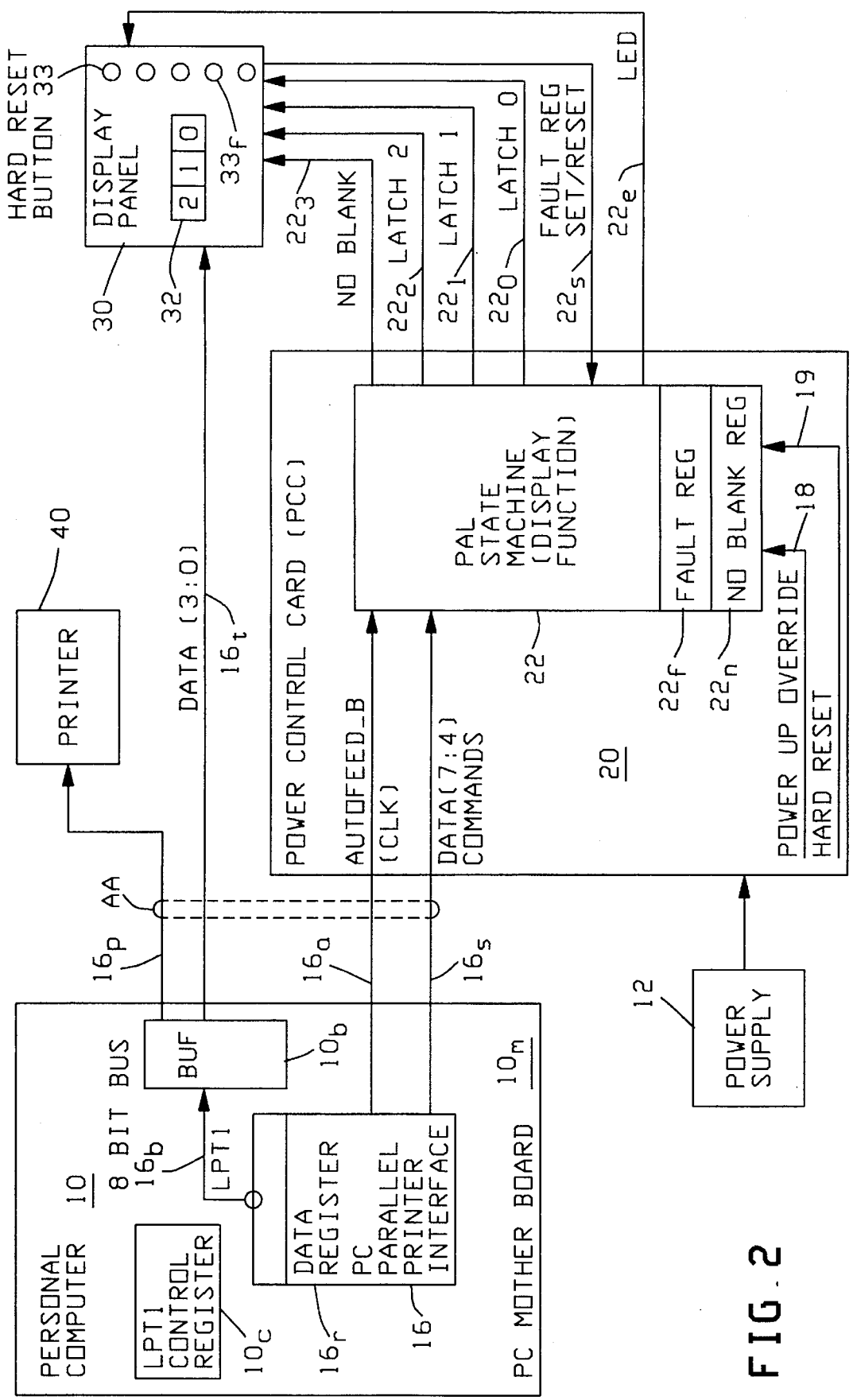
FIG. 2 is a detailed drawing showing the cooperative elements in the personal computer and the power control card for providing signals to the display panel.

FIG. 2 shows a more detailed diagram of the diagnostic protocol and display system of FIG. 1. As seen in FIG. 2, the motherboard $10_m$ provides a parallel printer interface 16 which holds a data register $16_r$ which then terminates in a port LPT1 (line printer terminal port) on which an 8 bit bus $16_b$ feeds the buffer $10_b$. Additionally, the personal computer motherboard $10_m$ also holds a control register $10_c$.

Figure 4A:
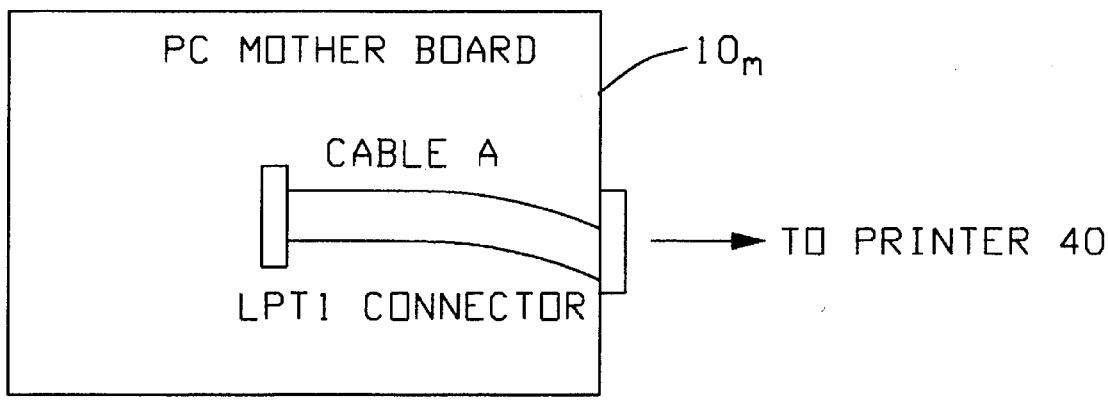
FIG. 4A is a schematic drawing of a typical type of motherboard shown connecting to a printer.
Figure 4B:
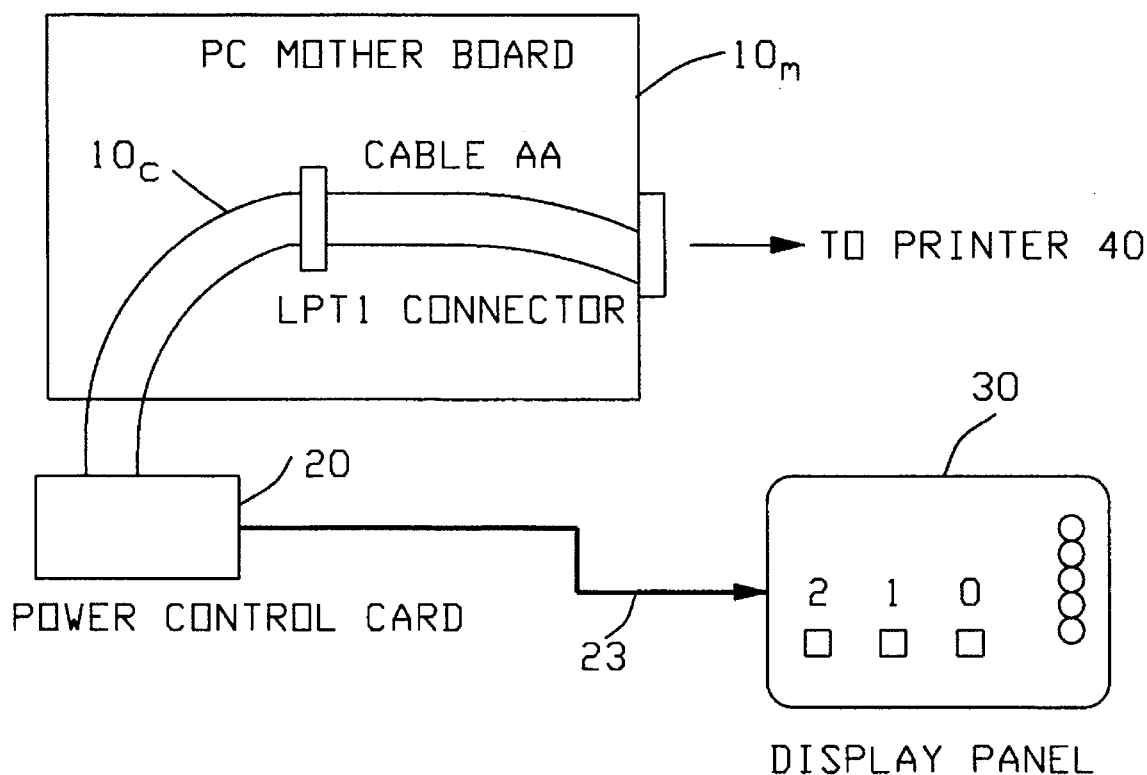
FIG. 4B is a schematic drawing showing how the modified cable of the line printer connector of the motherboard can be used to enable signals to provide diagnostic information to a display panel.

The PC buffer $10_b$ has a cable or bus $16_p$ which feeds the printer 40. Additionally, a cable AA (as also seen in FIG. 4B) encompasses a series of busses ($16_p$, $16_t$, $16_a$, $16_s$) some of which feed the power control card (PCC) 20 and the display panel 30.

The bus $16_t$ feeds 4 bits of data from the buffer $10_b$ to the display panel 30. The other parts of cable AA involve the busses $16_a$ and $16_s$. The bus $16_a$ is designated as the auto FEED-B (CLK) clock signal to the State Machine Unit 22. The bus $16_s$ carries 4 bits of data "commands" from the parallel printer interface 16 over to the State Machine Unit 22. The State Machine Unit 22 provides the protocol logic for the display panel unit 30, that is to say, a set of signals are sent to the display panel 30 in order to activate three display windows designated as digit position 0, digit position 1, and digit position 2, the entire 3-position window being designated as item 32. The State Machine Unit 22 is seen to have a fault register $22_f$ and a no-blank register $22_n$. The state machine has an input on line 19 from the hard reset button 33 of display panel unit 30 and also has another input (power up override) on line 18 from the power supply 12.

The State Machine Unit 22 functions as protocol logic unit. This unit 22 has a series of output lines which are fed to the display panel unit 30. The line $22_e$ is used to activate a light emitting device (LED) on the display panel unit 30. The line $22_s$ is the line for setting or resetting the fault register $22_f$ and provides an output from State Machine Unit 22 based on a command sent to the state machine. When the command (data bits [7:4]) equals 4, the fault register $22f$ is set and when the command (data bits [7:4]) equals 5, the fault register $22f$ is reset. The fault register operates to indicate that the system has detected an error condition and that the error code (describing that condition) is being displayed on the digital windows 32.

The lines $22_0$, $22_1$ and $22_2$ are the latching lines for the display windows for digit position 0, digit position 1, and digit position 2 respectively. The line $22_3$ is the "no-blank" line to the display panel unit 30 which "enables" the digit windows 32 for display of codes.

The display panel unit 30 is seen having a digit display panel with windows 32. These windows indicate the available digit windows for coded information as is shown in FIG. 1 as 2-1-0, i.e. digital window location 2, digital window location 1, and digital window location 0.

The power control card display panel unit 30 has the display windows 32 showing three hexadecimal LED digit positions 0, 1, 2, which can be used to display information related to the status of the system. A special "display panel protocol" is used to write to the display panel unit 30 through the 8-bit parallel printer port LPT1, seen in FIG. 2. This is done via bus $16_t$, FIG. 2.

The display logic in the protocol logic card of State Machine Unit 22 also contains the "fault register" $22_f$ and also a "no-blank register", $22_n$. If the fault register $22_f$ is "set", the fault-light emitting diode $33_f$ (LED) on the display panel unit 30 will be turned "on". If the no-blank register $22_n$ is "set", the display panel digits in windows 32 will be lit.

Once set, both the fault register $22_f$ and the no-blank register $22_n$ will remain "set" and can only be reset with subsequent commands or by depressing the "hard reset button" 33 on the display panel unit 30.

Two of the three registers, namely the "Data Register $16_r$, and the Control Register $10_c$ associated with the parallel port printer interface 16 are used to send the commands and data to the display panel 30.

The logic in State Machine Unit 22, FIG. 2 used to implement the protocol, is implemented via a Programmable Array Logic Unit such as a 22V10-PAL as manufactured by the Motorola Corp. or National Semiconductor Corp.

INITIALIZATION: Upon powering up of the system in FIG. 2, all states in the programmable array logic of State Machine Unit 22 will be initialized to "0" such that the fault register $22_f$ and the no-blank register $22_n$ are reset. During the period of time that the "power up" override signal on line 18 is asserted (generally about 7 seconds in the worst case), the display digits on window 32 will be lit.

During this period of time, the display logic in the State Machine Unit 22 will be fully functional and will accept commands from the line printer port LPT1, from interface 16.

Default, (after the Power-up Override Signal on line 18, FIG. 2) will be de-asserted to provide for the display digits on windows 32 to be "blank" unless the "no-blank register $22_n$" has been "set" through a command during that time. The system software (in the disk unit of PC10) sends a command (CMD-7) to the display logic in State Machine Unit 22 in order to "un-blank" the display (via line $22_3$) prior to writing to it.

The system software sends a display command by writing to the line printer port (LPT1). it is now up to the State Machine Unit 22 to sense that this data is "not" for the printer 40, but rather for the display unit 30. This "sensing" is arranged by use of the "Sequence 1" and "Sequence 2" signals. Thus a valid command for display operation in State Machine Unit 22 must be preceded by the SEQ1 and SEQ2 signals which activate the State Machine 22 and indicate that the data is for the display windows 32 on display unit 30.

The "hard reset" button 33 on the display panel 30 (FIG. 2) operates such that when depressed, it will send a "reset" to the motherboard $10_m$ as well as to the display logic in the programmable array logic protocol state machine PAL 22. This hard reset signal will clear all states to "0" and also reset the "fault register" $22_f$ and also the "no-blank" register $22_n$. However, the current contents of the display digits, in window 32, will be unchanged at this time.

POWER CONTROL CARD DISPLAY COMMAND DEFINITIONS

The bits (7:4) of the port LPT1 data register $16_r$, (FIG. 2) are used to define the power control card 20 (PCC) display commands and the bits (3:0) are used to hold the display values to be written to any one of the three display digit positional windows 32. The cable AA data bits (7:0) are defined as follows, and shown in the attached Table I.

TABLE I

| bit | | | | CMD | FUNCTION | bit | | | |
|---|---|---|---|---|---|---|---|---|---|
| 7 | 6 | 5 | 4 | | | 3 | 2 | 1 | 0 |
| 1 | 0 | 1 | 0 | A | Sequence 1 | x | x | x | x |
| 1 | 1 | 0 | 0 | C | Sequence 2 | x | x | x | x |
| 0 | 0 | 0 | 0 | 0 | no operation | x | x | x | x |
| 0 | 0 | 0 | 1 | 1 | Write to digit 0 | (display value) | | | |
| 0 | 0 | 1 | 0 | 2 | Write to digit 1 | (display value) | | | |
| 0 | 0 | 1 | 1 | 3 | Write to digit 2 | (display value) | | | |
| 0 | 1 | 0 | 0 | 4 | Reset Fault Register | x | x | x | x |
| 0 | 1 | 0 | 1 | 5 | Set Fault Register | x | x | x | x |
| 0 | 1 | 1 | 0 | 6 | Blank display | x | x | x | x |
| 0 | 1 | 1 | 1 | 7 | Do not blank display | x | x | x | x |

Note: x = don't care; undefined states will be ignored.

Table I shows the 8-bits of bus $16_b$ (FIG. 2) which are encompassed in FIG. 2 by the data bus $16_t$ and the command bus $16_s$. Table I shows how bit locations 4, 5, 6 and 7 are organized to provide the various commands A, C, 0 thru 7 in addition to the individual functions provided by each of these commands. The bit locations 0, 1, 2, 3, are undefined states which can be ignored, except for the commands 1, 2, and 3, which write respectively to the digit location 0, the digit location 1, and the digit location 2 of windows 32 for displaying a value which represents useful information to the operator.

POWER CONTROL CARD SIGNALS FOR DISPLAY INPUT CONTROL

The line printer terminal port LPT1 has a parallel printer interface unit 16, FIG. 2, which provides control signals to the PCC card 20 which are sourced by the LPT1 control register $10_c$ on the motherboard, $10_m$. The LPT1 control register $10_c$ is shown on the PC motherboard $10_m$ of FIG. 2. On the control signals (listed below), and transmitted to the power control card 20, it should be indicated that the signal names which end in "_B" are "low" active signals. The following control signals are sourced by the control register $10_c$:

Bit 0: STROBE_B: This signal is low active on the LPT1 bus ($16_t$) and a "1" must be written to the LPT1 data register $16_r$ to cause it to be asserted. This signal is not used in the PCC display logic State Machine Unit 22.

Bit 1: AUTOFEED_B: This signal on bus $16_a$ is used to simulate a clock to the power control card logic protocol State Machine Unit 22. Bit 1 of the control register $10_c$ must be initialized to a "1". To send a clock, this bit must be toggled from "1" to "0" and then back to "1". This signal is inverted twice to delay it to a minimum of 20 nanoseconds before entering the programmable array logic of the State Machine Unit 22. This is discussed further in the programming example provided hereinafter in FIG. 6.

Bit 2: INIT: This signal is not used in the display logic of State Machine Unit 22. During the PCC display accesses, the original state of this bit is left unchanged in order to avoid erroneously initializing the printer. This signal is used on bus $16_p$ of FIG. 2 for initializing the printer 40.

Bit 3: SELECT_B: This signal is not used in the PCC State Machine Unit logic $22_p$. During the PCC display accesses, the original state of this bit is left unchanged.

Bit 4: ENABLE INTERRUPT: This bit must be reset in order to inhibit interrupts from being generated to the motherboard $10_m$ while the PCC display 30 is being accessed. This bit is reset within the motherboard $10_m$ and is not transmitted to the display logic in the protocol State Machine 22.

Signals that are used for transmission from PCC 20 (Power Control Card) to the display unit 30 include:

(a) PWRUP-OVRD: (Power-Up Override) This signal on line 18 is "high" upon power-up of the operating system and remains high for about 6 to 7 seconds. During this period of time, the logic that monitors cooling fan failures is disabled. This signal is used to force the "no-blank" signal on line $22_3$ to be "low" such that the contents of the three panel display digits 32 are "lit".

(b) H_RST: (Hard Reset Bar) This signal on line 19 is asserted when the "reset" switch 33 on the display panel unit 30 is depressed. While the switch is depressed, the display logic State Machine Unit 22 will be cleared to state "0", and the fault register $22_f$ and the no-blank register $22_n$ will be reset. The display logic state machine is shown at block 22 of the power control card 20 of FIG. 2.

Figure 3:
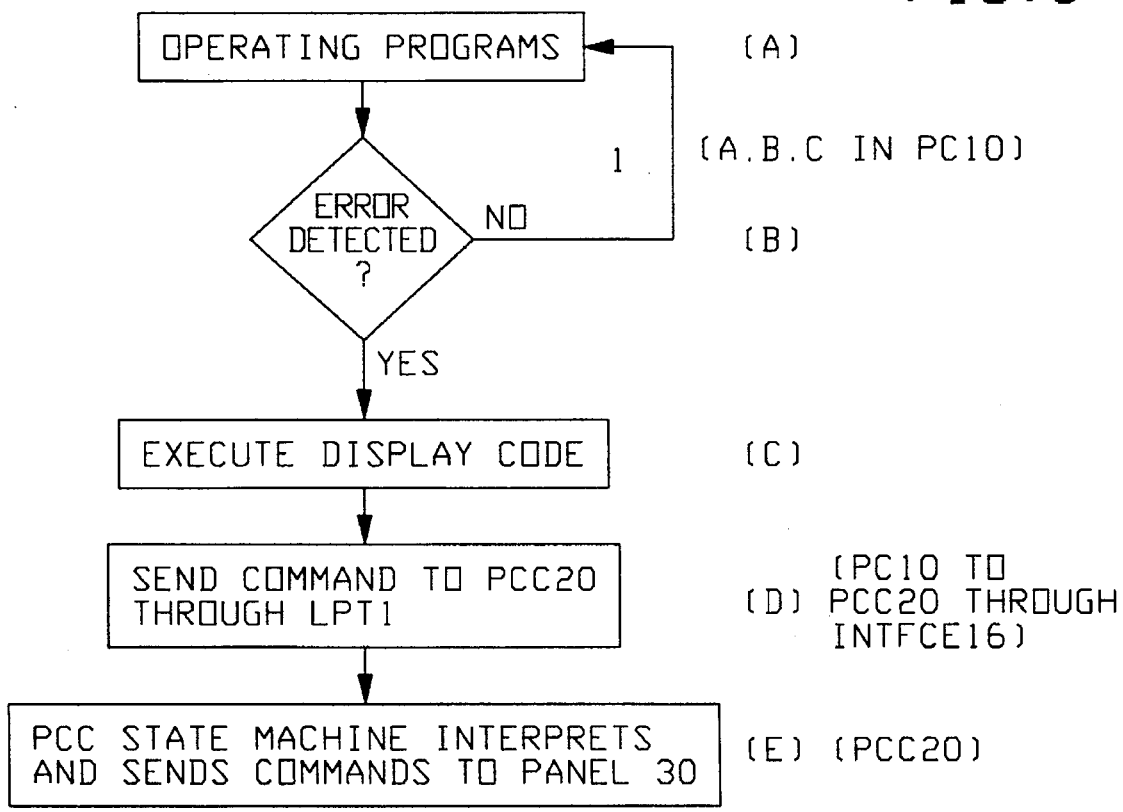
FIG. 3 is a flow chart indicating how the diagnostic software can detect an error after which it can send commands to the power control card in order to cause the display panel to indicate code data for interpretation.

FIG. 3 is a flow chart showing the operation of the diagnostic protocol and display system. At step A it is seen that the personal computer 10 is operating in conjunction with the running of diagnostic software. No action occurs until such time (B) as the diagnostic software detects an error.

Upon detection of an error at step B, the personal computer 10 will send an error command to the operating program in the personal computer (PC 10), to initiate diagnostic display code information.

Thus at step C, the commands from the personal computer will activate the power control card 20 and initiate action whereby various status commands and digital value data will be sent to the display panel 30. This is shown at step D and step E.

Figure 5:
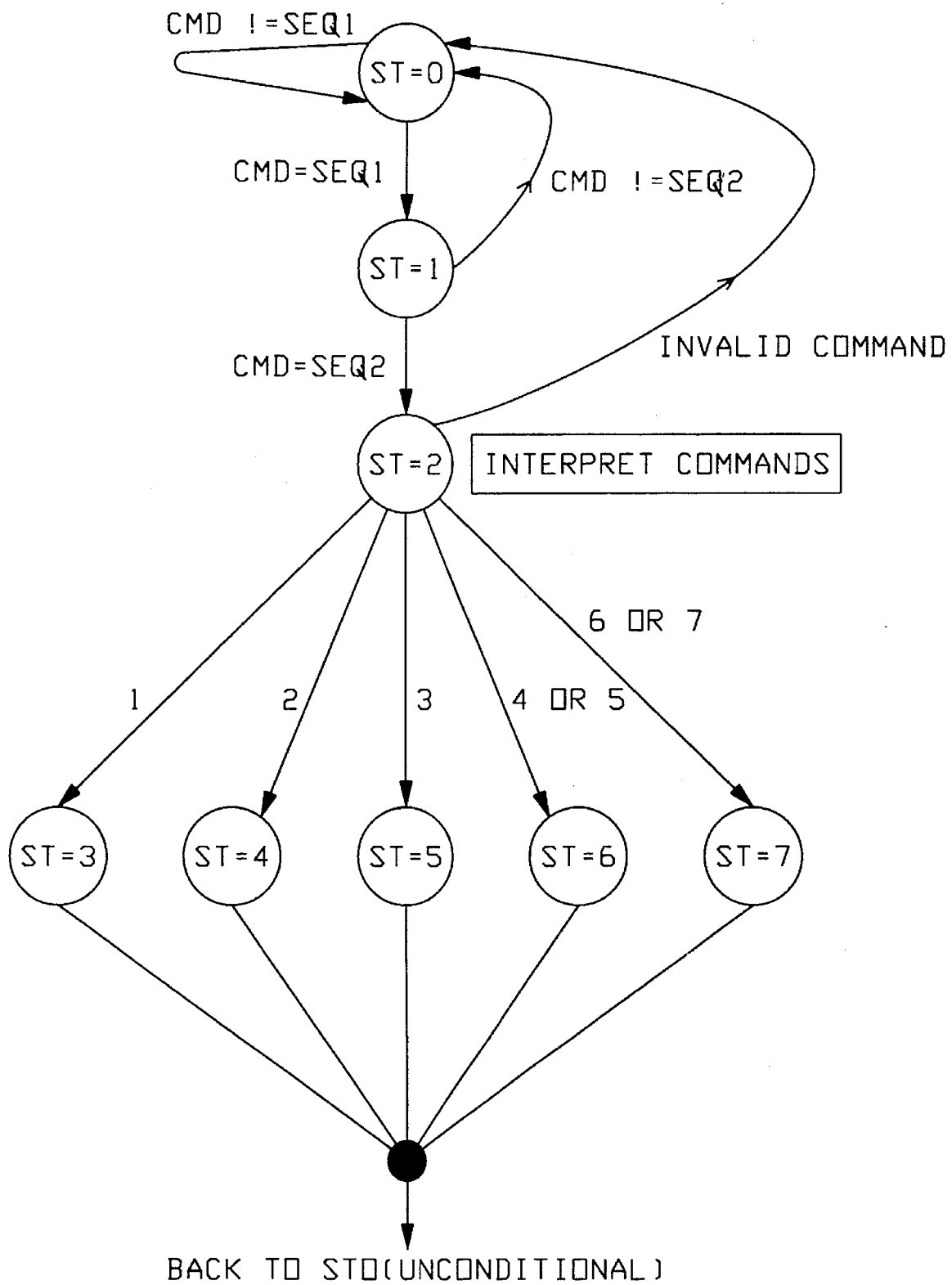
FIG. 5 is a flow diagram showing the operations of the state machine in the power control card.

As seen in FIG. 5 the State Machine Unit 22 controls and operates through some eight different state conditions. These are designated as ST=0, ST=1, . . . ST=6, ST=7, as seen in FIG. 5.

The attached Table II shows the definition of various symbols used in the functional equations as shown in Table IV.

TABLE II

| | |
|---|---|
| ! | LOGICAL NOT<br>If before an output term, it means output is active LOW when equation is TRUE. If before an input term, it means input is active LOW for that term to be TRUE. |
| & | LOGICAL AND |
| # | LOGICAL OR |
| := | Clocked output. Output given value of equation following rising edge of clock. |
| = | Combinatorial output. Output will be determined by logic equation and combinatorial enabling term. |
| .ar | Asynchronous rest. |
| .oe | Output enable. |

As illustrated in FIG. 5, the State Machine Unit 22 in the PCC 20 is normally at ST=0 looking for a valid command. Any valid command to the PCC must be preceded by a command of "SEQ1" and a command of "SEQ2". This scheme ensures that the State Machine Unit 22 will only respond to "genuine" Panel Display commands. When a "SEQ1" command is received at ST=0, the state machine changes its state to ST=1, expecting to receive "SEQ2" command next. If a "SEQ2" command is "not" received with the next clock, the state machine changes its state back to ST=0 and starts looking for a command of "SEQ1" again. If, while at ST=1, it receives a command of "SEQ2" with the next clock, the state machine changes its state from ST=1 to ST=2.

At ST=2, the State Machine Unit 22 is enabled, and with the next clock, will look for the particular command. If the command is "1" (See Table I, Command List) then the state machine changes its state to ST=3. If the command is "2" then the state machine changes its state to ST=4. If the command is "3" then the state machine changes it state to ST=5. If the command is "4 or 5" then the state machine changes its state to ST=6. If the command is "6 or 7" then the state machine changes its state to ST=7. The next clock will see the state machine going back to ST=0.

At ST=3, "Latch 0" will be asserted and set in order to write to digit position 0 of the display. At ST=4, "Latch 1" will be asserted and set in order to write to digit position 1 of the display. At ST=5, "Latch 2" will be asserted and set to write to digit position 2 of the display. At ST=6, if the command received had been "4", (Table I) then "fault reg set/reset" line ($22_s$) will be "low" to reset the fault register. At ST=6, if the command received had been "5", (Table I) then "fault reg set/reset" line ($22_s$) will be "high" to set the fault register. At ST=7, if the command received had been "6", (Table I) then the "no blank" signal ($22_3$) will be "low" to blank the display. At ST=7, if the command received had been "7", (Table I) then the "no blank" signal ($22_3$) will be "high" to "not blank" the display.

Table III shows the input pins to the programmable address logic of the display unit 30, FIG. 2.

TABLE III

| Input Pin Definitions For Disiplay PAL (State Machine 22) | |
|---|---|
| h_rst | pin 2; "hard push button rest" |
| spare | pin 3; "not used" |
| init_b | pin 4; |
| strobe | pin 5; "s/b low all the time" |
| select | pin 10; "s/b low to enable pcc display" |
| clockin | pin 1; "clock derived from autofeed_b" |
| data 4 | pin 6; |
| data 5 | pin 7; |
| data 6 | pin 8; |
| data 7 | pin 9; |
| cmd | = [data7,data6,data5,data4]; |
| seq1 | = [1, 0, 1, 0]; "first qualifying pattern." |

The logic operation of the various state conditions shown in FIG. 5 can be described by a series of logic equations which are attached here below as Table IV (using the notations of Table II).

TABLE IV

```
[st,latch_dig0,latch_dig1,latch_disg2,
sys_fault].oe = pal_test1;
[noblank_reg,no_blank_b].oe = ap1_test1;
[sys_fault,noblank_reg,st].clk = clockin;
[sys_fault,noblank_reg,st].ar = h_rst*!pwrup_ovrd
no_blank_b = !noblank_reg;
state_diagram st
    state st0:
        noblank_reg := noblank_reg;
        sys_fault := sys_fault;
        if (cmd = seq1) then st1 else st0;
    state st1:
        noblank_reg := noblank_reg;
        sys_fault := sys_fault;
        if (cmd = seq2) then st2 else
            if (cmd = seq1) then st1 else st0;
    state st2:
        noblank_reg := noblank_reg;
        sys_fault := sys_fault;
        if (cmd = latch0) then st3 else
            if (cmd = latch1) then st4 else
            if (cmd = latch2) then st5 else
            if (cmd = cmd_fault) then st6 else
            if (cmd = cmd_blank) then st7 else st0;
    state st3:
        sys_fault := sys_fault;
        noblank_reg := noblank_reg;
        latch_dig0 = 1;
        goto st0;
    state st4:
        sys_fault := sys_fault;
        noblank_reg := noblank_reg;
        latch_dig1 = 1;
        goto st0;
    state st5:
        sys_fault := sys_fault;
        noblank_reg := noblank_reg;
        latch_dig2 = 1;
        goto st0;
    state st6:
        "set or reset fault register"
        sys_fault := data 4;
        noblank_reg := noblank_reg;
```

TABLE IV-continued

```
    state st7:
        "set or reset noblank register"
        noblank_reg := data 4;
        sys_fault := sys_fault;
        goto st0;
```

The attached Table V provides a definition of the data bits involved for the functions of the various eight bits of data presented to the display unit 30.

TABLE V

| | | | | Definition Of Data Bits | | | | |
|---|---|---|---|---|---|---|---|---|
| | | bit (line $16_s$ FIG. 2) | | | bit (Data Line $16_t$, FIG. 2) | | | |
| 7 | 6 | 4 | 5 | FUNCTION | 3 | 2 | 1 | 0 |
| 1 | 0 | 1 | 0 | Qualifying seq 1 | x | x | x | x |
| 1 | 1 | 0 | 0 | Qualifying seq 2 | x | x | x | x |
| 0 | 0 | 0 | 1 | Write to digit 0 | [display value 0–F] | | | |
| 0 | 0 | 1 | 0 | Write to digit 1 | [display value O–F] | | | |
| 0 | 0 | 1 | 1 | Write to digit 2 | [display value O–F] | | | |
| 0 | 1 | 0 | 0 | Reset Fault Register | x | x | x | x |
| 0 | 1 | 0 | 1 | Set Fault Register | x | x | x | x |
| 0 | 1 | 1 | 0 | Blank display | x | x | x | x |
| 0 | 1 | 1 | 1 | Do not blank display | x | x | x | x |

Figure 6:
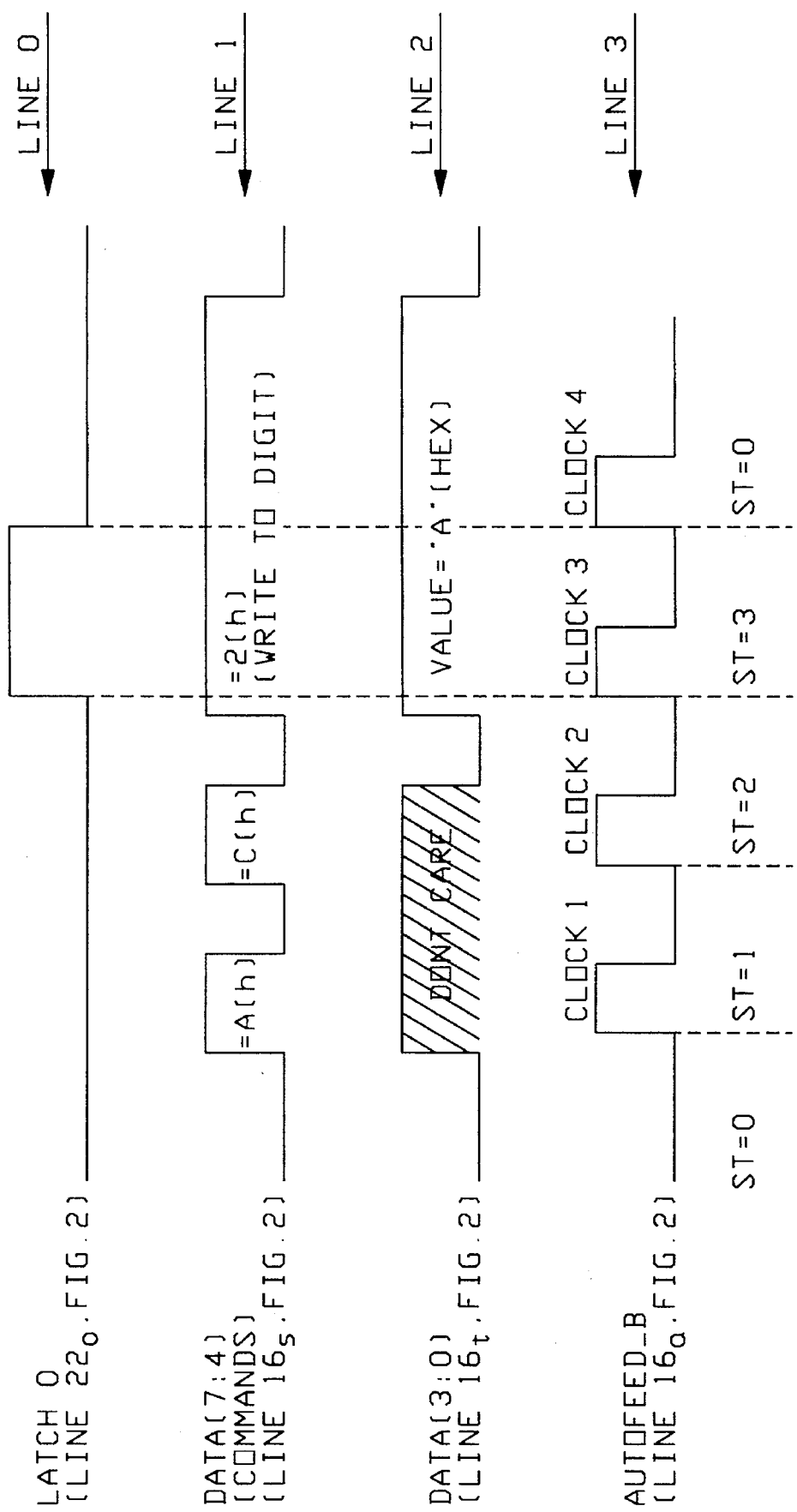
FIG. 6 is a timing diagram to provide an example of how a character is written to the positional display digits of the display panel.

FIG. 6 is a display timing diagram which is used in conjunction with an example of writing "A" to the digit position "0".

At line 1 of FIG. 6, the data commands are provided for "A" (hexadecimal) and subsequently "C" (hexadecimal) with the subsequent period for writing to digit position 1.

On line 2 of FIG. 6, the initial period for the four data bits is irrelevant until the later portion where the value of "A" in hexadecimal is digitally presented.

In line 3 of FIG. 6, the autofeed clocking signal is initiated at state=0 and operates through state 1, state 2, state 3, and back to state 0 on the fourth clock (clock 4).

Seen below is a programming example of the assembly program which illustrates the coding in order to implement a command such as "Write to digit position 1" with the value of "A" (hexadecimal).

PROGRAMMING EXAMPLE

The following assembly program illustrates the code to implement a "Write to digit 1" command with a value of "A" (hexadecimal). Note the section below, labelled "INITIALIZE", which starts off the current values of the LPT1 data register $16r$ as well as the LPT1 Control Register $16_c$. For this example, the LPT1 port address for the Data Register is at "3BC" and the corresponding Control Register is at "3BE". This program example is based on assembly code instructions used in Intel processors as referenced in the Intel iAPX 86/88, i86/i88, 186/188 User's Manual (Programmer's Reference) May 1983 at pages 3–39 through 3–170, published by Intel Corporation, 3065 Bowers Ave., Santa Clara, Calif. 95051.

```
INITIALIZE:

MOV DX, 3BC
IN AL, DX
MOV[SAVE], al      ;SAVE OFF CURRENT VALUES OF
MOV DX, 3BE        ;DATA AND CONTROL REGISTERS IN MEMORY
IN AL, DX
MOV[SAVE2], AL
```

-continued

```
OUT DX, AL
START:

MOV DX, 3BC
MOV AL, A0          ;SEQ1
OUT DX, AL
MOV DX, 3BE
MOV AL, [SAVE2]
AND AL, FC          ;"0" TO AUTOFEED BIT TO SEND CLOCK.
OUT DX, AL          ;CLOCK #1
OR AL, 2            ;"1" TO AUTOFEED BIT FOR NEG.CLOCK EDGE
OUT DX, AL
MOV DX, 3BC
MOV AL, C0          SEQ 2
OUT DX, AL
MOV DX, 3BE
MOV AL, [SAVE2]
AND AL, FC          ;"0" TO AUTOFEED BIT TO SEND CLOCK.
OUT DX, AL          ;CLOCK #2
OR AL, 2            ;"1" TO AUTOFEED BIT FOR NEG. CLOCK EDGE
OUT DX, AL
MOV DX, 3BC
MOV AL, 2A          ;COMMAND TO WRITE DIGIT 1 WITH "A"
OUT DX, AL
MOV AL, [SAVE2]
AND AL, FC          ;"0" TO AUTOFEED BIT TO SEND CLOCK.
OUT DX, AL          ;CLOCK #3
OR AL, 2            ;"1" TO AUTOFEED BIT FOR NEG. CLOCK EDGE
OUT DX, AL
MOV DX, 3BE
MOV AL, [SAVE2]
AND AL, FC          ;"0" TO AUTOFEED BIT TO SEND CLOCK.
OUT DX, AL          ;CLOCK #4
OR AL, 2            ;"1" TO AUTOFEED BIT FOR NEG. CLOCK EDGE
OUT DX, AL
(GO TO "START" IF MORE COMMANDS ELSE GO TO FINISH)
FINISH:

MOV DX, 3BC
MOV AL, [SAVE1]
OUT DX, AL          ;REPLACE PRIOR VALUE TO DATA REG.
MOV AL, [SAV2]
MOV DX, 3BE
OUT DX, AL          ;REPLACE PRIOR VALUE TO CONTROL REG.
                    --END OF EXAMPLE--
```

Described herein is a system where the output bus cable of a personal computer is used in a dual function, that is (i) to convey data to a printer and (ii) to convey codes representing error conditions to a power control card holding a state machine which recognizes error codes as different from printer data, and selects the error codes for display on a display panel unit thus informing the operator of various error conditions occurring.

While the preferred embodiment illustrates one example of effectuating both printer operations and diagnostic error readout from the same output cable, it should be understood that other implementations may still be encompassed by the following claims.

What is claimed is:

1. In a computer system having a port terminal connector and servicing a peripheral printer means, apparatus for enabling the display of system status data codes and diagnostic error codes without inhibiting printer information data transfer to said peripheral printer means said apparatus comprising:

(a) means for transferring said printer information data to said peripheral printer means including;
  (a1) processor means for processing said printer information data and generating coded data for said diagnostic error codes and said system status data codes;
  (a2) said first branch including bus means for transferring said printer information data to said printer means;
  (a3) said printer means for printing said printer information data;
(b) means for transferring said system status data codes and diagnostic error codes to a peripheral control unit for visual display under regular operating conditions and also during initialization of said computer system said means including:
  (b1) a control register for holding commands for transmission of said codes to a state machine means, said register holding an SEQ1 and SEQ2 command for indicating the transmission of code data for a display means:
  (b2) a data register for holding said codes for transmission to said display means;
  (b3) said state machine means for enabling said display means to visually display said codes in a display window unit, only after receiving said SEQ1 and SEQ2 commands in a two clock sequence;
  (b4) said second branch including bus means in said cable means for connecting said control register and said data register to said state machine means;
  (b5) said display means having said display window unit holding a plurality of display windows to display said codes;

(c) dual path Y cable means connected to said port terminal connector having a first branch for conveying printer information data to said peripheral printer means and a second branch for conveying said system status data codes and diagnostic error codes to a display means.

2. The apparatus of claim 1 wherein said display means includes:
(a) means to blank out said display windows momentarily during power up without inhibiting the display of said system status data codes and said diagnostic error codes during initialization.

3. The apparatus of claim 1 wherein said display means includes:
(a) a manually operated "reset" switch operable to set said processor means and state machine means to their initial condition.

4. A diagnostic and display system for reporting system status conditions and error conditions comprising:
(a) Computer means having a line printer port terminal supporting a Y cable means for providing first, second and third bus means, for executing commands and transmitting printer data output for printout to an associated printer, said computer means including:
 (a1) buffer means for temporary storage of printer data output and connected to said Y cable means;
 (a2) said Y cable means holding a plurality of busses, and including;
  (a2a) said first bus means connecting said buffer means to said associated printer;
  (a2b) said second bus means for transmitting system status data codes and diagnostic error codes to a display panel unit means;
  (a2c) said third bus means for transmitting clock and command signals to a state machine control means;
 (a3) means to generate an SEQ1 and SEQ2 command in two consecutive clock periods to signal said state machine control means that status or error codes are being transmitted for display on said display panel unit means;
(b) said state machine control means providing control signals to said display panel unit means for display of said system status data codes and diagnostic error codes on a plurality of digital position windows during printer operating conditions and during system initialization, said state machine control means including:
 (b1) means to distinguish said system status data codes and diagnostic error codes from said printer data appearing on said first bus means connected to said buffer means;
 (b2) means to enable/disable the visual display on said digital position windows, including:
  (b2a) means to enable the display of said codes in said digital position windows when said system status data codes and diagnostic error codes appear on said second bus means said means to enable being activated only after receipt of said SEQ1 and SEQ2 commands;
(c) said display panel unit means providing a plurality of digital position windows and including:
 (c1) means to receive said system status and error codes for visual display in said digital position windows.

5. The system of claim 4 wherein said state machine control means includes:
(a) a fault register means for indicating that the system has detected an error and is displaying said diagnostic error codes in said digital position windows;
(b) a no blank register means which, when set, will enable a lighted display on said plurality of digital position windows.

6. The system of claim 4 wherein said state machine control means includes:
(a) means to temporarily blank out and inhibit visual display on said digital position windows during power up of the system without inhibiting the display of said system status and error codes during initialization.

7. In a computer system having a common output cable having a first bus to a printer peripheral unit and second bus to a display unit, a method for concurrently displaying system status data codes and diagnostic error codes during printer operations comprising the steps of:
(a) generating printer data and system status data codes and diagnostic error codes for output on a common cable wherein said data and error codes are preceded by a two-clock sequence of a SEQ1 command and SEQ2 command;
(b) separating said output data signals into printer data and system status codes and error codes:
(c) concurrently routing said codes onto a display unit for observation by an operator only after generation of said SEQ1 and SEQ2 commands occur sequentially in a two-clock period;
(d) concurrently routing said printer data onto said printer peripheral unit for printout.

* * * * *